3,196,170
PROCESS FOR THE PREPARATION OF 19-NOR-DESOXYCORTICOSTERONE AND 21-ESTERS THEREOF
Percy George Holton, Mexico City, Mexico, assignor to Syntex Corporation, Panama, Panama, a corporation of Panama
No Drawing. Filed Oct. 7, 1963, Ser. No. 314,547
13 Claims. (Cl. 260—397.47)

This invention relates to cyclopentanopolyhydrophenanthrene compounds and to a novel method for their preparation.

More particularly, this invention relates to a novel method of preparing 19-nor-desoxycorticosterone (19-nor-$\Delta^4$-pregnen-21-ol-3,20-dione) and 21-esters thereof, and further relates to novel intermediates obtained by carrying out said method.

19-nor-desoxycorticosterone and its 21-esters are, as disclosed in U.S. Patent No. 2,861,085 to Djerassi et al., useful cortical hormones which exhibit enhanced potency as compared to the natural hormone desoxycorticosterone or the 21-esters thereof. In addition, it has been found that 19-nor-desoxycorticosterone and its 21-esters, and especially the acetate, raise the brain's electroshock threshold and reduce brain excitability, and thus can be used as a corrective for brain hyperactivity such as that induced by certain corticoids. 19-nor-desoxycorticosterone and its 21-esters also protect the brain against Agene-induced convulsions, and their anti-convulsant properties make them useful in the treatment of both petit mal and grand mal epilepsy. Furthermore, the cardiotonic properties of 19-nor-desoxycorticosterone and its 21-esters make them of value whenever a cardiac stimulant is indicated, while their pressor properties render them useful in hypotensive situations, e.g., in shock therapy or for the treatment of post-operative conditions.

Of the methods for the preparation of 19-nor-desoxycorticosterone known to the art at the present time some are lengthy, others require expensive or difficultly obtainable starting materials, others give only moderate yields, and still others combine some or all of these drawbacks. In short, all have proven unsatisfactory for one reason or another. In contrast to this, however, the present invention provides a simple method, beginning with a readily available starting material, which not only gives good yields of 19-nor-desoxycorticosterone or a 21-ester thereof but also produces intermediates which are themselves of value as therapeutic steroids.

The method of the present invention can be illustrated by means of the following reaction sequence:

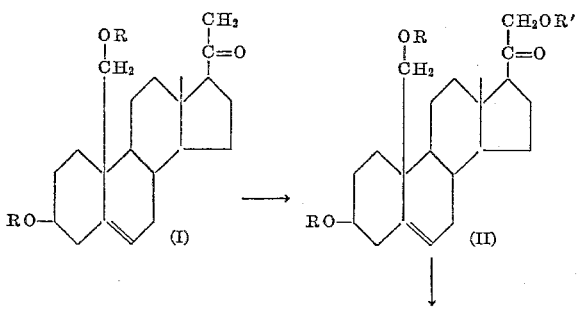

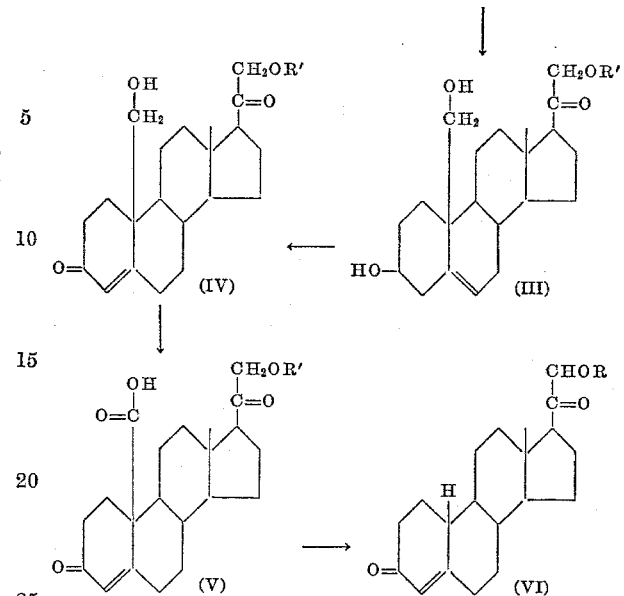

In these formulas R represents an acyl group containing less than 12 carbon atoms and $R^1$ represents hydrogen or an acyl group containing less than 12 carbon atoms. A preferred class of esters, and especially 21-esters, encompasses those compounds wherein the acyl group is derived from a hydrocarbon carboxylic acid containing less than 12 carbon atoms. Such acids can be saturated or unsaturated, or straight, branched, cyclic or cyclic-aliphatic chain, or aromatic, and can also either be unsubstituted or substituted by functional groups such as hydroxyl, alkoxy containing up to 6 carbon atoms, acyloxy containing up to 12 carbon atoms, nitro, amino or halogen. Included among such acyl groups are the acetate, t-butylacetate, trimethylacetate, aminoacetate, phenoxyacetate, propionate, cyclopentylpropionate, $\beta$-chloropropionate, enanthate, benzoate, and the like.

In carrying out the process represented by the above reaction sequence, the starting material, namely, a 3, 19-diacylate of $\Delta^5$-pregnene-3$\beta$, 19-diol-20-one (I), e.g., the diacetate, obtained as described in U. S. Patent No. 3,065,228 to Bowers, is acetoxylated at the 21-position to provide the corresponding 21-acetoxy derivative, e.g., $\Delta^5$-pregnene-3$\beta$,19,21-triol-20-one 3,19,21-triacetate (II; R and $R^1$=acetyl). Acetoxylation is preferably accomplished directly by reacting the starting material with lead tetraacetate in the presence of a catalytic amount of a strong acid, such as hydrochloric acid, sulfuric acid, p-toluenesulfonic acid, perchloric acid, and the like, or a Lewis acid (an electron pair-acceptor which will react with a Lewis base), e.g., stannic chloride, zinc chloride, boron trifluoride etherate, and the like, and preferably the latter. This reaction will generally be conducted under substantially anhydrous conditions in a suitable organic solvent, such as benezene, toluene, xylene, and the like, as well as mixtures thereof with each other or preferably with relatively small amounts of a lower alkanol, e.g., methanol, and preferably will be carried out at room temperature (about 25° C.) for from about 3 hours to about 9 hours, although higher or lower reaction temperatures coupled with shorter or longer reaction times can also be employed if desired.

Following the acetoxylation reaction, the resulting 3,19,21-triacylate is deesterified at the 3- and 19-positions, leaving an acyloxy group at the 21-position. This can be accomplished by any of several suitable methods. One such method involves first completely deesterifying the 3,19,21-triacylate, e.g., $\Delta^5$-pregnene-3$\beta$-19,21-triol-20-one 3,19,21-triacetate, which can be done by refluxing it with methanolic sodium or potassium hydroxide, and then selectively esterifying the 21-hydroxyl group in the resulting triol, e.g., by reacting the triol in pyridine at from about $-30°$ C. to about $0°$ C., and preferably at $-20°$ C., with an amount of an acid anhydride, e.g., acetic anhydride, slightly in excess of the stoichiometric amount required for esterification of the 21-hydroxyl group, e.g., a 5–10% excess.

Another suitable method involves first selectively deesterifying a 3,19,21-triacylate, wherein none of the acyl groups is a benzoyl group, at the 21-position by means of malt enzyme (found in brewers' malt), then benzoylating the resulting 21-hydroxy-3,19-diacylate, using conventional esterification conditions, to provide the corresponding 3,19-diacylate-21 - benzoate, and finally subjecting this latter triester to acid hydrolysis, preferably by refluxing it in an inert organic solvent such as ethanol, with an acid such as hydrochloric acid, to remove the acyl groups at the 3- and 19-positions, thereby producing the corresponding 3,19-dihydroxy-21-benzoyloxy steroid.

In the next step of the novel method of the present invention, the 3,19-dihydroxy-21-acyloxy steroid, e.g., $\Delta^5$-pregnene - 3$\beta$,19,21 - triol - 20 - one 21 - acetate (III; $R^1$=acetyl), is subjected to Oppenauer oxidation, i.e., reaction with aluminum isopropoxide in cyclohexanone, to produce the corresponding $\Delta^4$-3-keto derivative, e.g., $\Delta^4$-pregnene-19,21 - diol-3,20 - dione 21 - acetate (IV; $R^1$=acetyl). This reaction will generally be carried out in a suitable inert organic solvent, such as benezene, toluene, xylene, and the like, as well as mixtures thereof, under substantially anhydrous conditions, and preferably at reflux temperature for from about 30 minutes to about 1 hour or longer.

The resulting $\Delta^4$-3-ketone is then oxidized to give the corresponding 10-carboxy steroid, e.g., 10-carboxy-$\Delta^4$-pregnen-21-ol-3,20-dione 21-acetate (V; $R^1$=acetyl). This oxidation reaction is preferably accomplished by means of the Jones procedure, i.e., the $\Delta^4$-3-ketone (IV), dissolved in a suitable inert organic solvent, such as acetone, methyl ethyl ketone, dioxane, and the like, is treated with aqueous 8 N chromic acid, under an inert atmosphere, e.g., an atmosphere of nitrogen, and at a temperature of from about $-20°$ C. to about $5°$ C., and preferably, at $0°$ C., until the color of the reagent persists in the reaction mixture.

In the final step illustrated in the above reaction sequence, the 10-carboxy steroid (V) is decarboxylated, thus yielding a 19-nor-desoxycorticosterone 21-acylate, e.g., the acetate (VI; $R^1$=acetyl). This can be accomplished by simply heating the 10-carboxy steroid to a temperature of from about $50°$ C. to about $100°$ C., but preferably by refluxing for 1 hour or longer in a suitable inert organic solvent, e.g., a lower alkanol such as methanol, ethanol, propanol, and the like, either alone or in the presence of from 2–3% of a strong acid such as hydrochloric acid and the like. During this decarboxylation reaction, and especially when acid is present, a certain amount of deacylation can occur at the 21-position, particularly if the acyl group present is a more readily hydrolyzable group, such as acetyl and the like, rather than a more difficultly hydrolyzable group, such as benzoyl and the like. In such a case, the resulting 19-nor-desoxycorticosterone can, if desired, be reacylated, preferably while still in a crude form, or it can be separated as such from the reaction mixture.

As indicated hereinabove, the compounds represented by Formulas III, IV and V hereinabove, i.e., the free 21-hydroxy compounds and their 21-esters, are also of value as therapeutic steroids, inasmuch as they also exhibit, generally to a somewhat delayed and/or more moderate extent, the valuable properties of 19-nor-desoxycorticosterone and its 21-esters.

The 21-acylates of Formulas III–VI, inclusive, hereinabove, wherein $R^1$ represents primarily an acetyl or a benzoyl group (although other acyloxy radicals can be introduced at the 21-position of compound I through the use of lead tetraacylates other than the tetraacetate, e.g., lead tetrapropionate, tetrabutyrate, and the like, and other acyl groups can be used to selectively esterify the 21-hydroxy group in the triol derived from compound II by employing anhydrides other than acetic anhydride), can be saponified by conventional procedures to provide the corresponding free 21-hydroxy compounds. These, in turn, with the exception of the 10-carboxy steroids of Formula V, can be reesterified with any other acyl group conventionally employed in esterifying steroid hormones, e.g., those mentioned hereinabove, using conventional procedures, such as treating the free 21-hydroxy steroid with an acyl halide or an acid anhydride in an inert organic solvent, such as pyridine, collidine, lutidine, and the like, as well as mixtures thereof with each other or with other inert organic solvents, such as benzene, toluene, xylene, and the like, at a temperature ranging from about room temperature or lower to reflux temperature for from about 30 minutes to about 15 hours or longer.

In order that those skilled in the art can more fully understand the present invention, the following examples are set forth. These examples are given solely by way of illustration, and should not be considered as expressing limitations unless so set forth in the appended claims. All percentages are by weight, unless otherwise stated.

*Example I*

To a suitable reaction vessel equipped with a stirrer there were added 4.16 grams [10 mmols (millimoles)] of crystalline $\Delta^5$-pregnene-3$\beta$,19-diol-20-one 3,19-diacetate, 4.62 grams (11 mmols) of substantially anhydrous lead tetraacetate, 120 ml. of sodium-dried benzene and 6 ml. of substantially anhydrous methanol. Next, 15 ml. of redistilled boron trifluoride etherate were added, with stirring, and the resulting reaction mixture was stirred at room temperature for 5 hours. Following this reaction period the reaction mixture was poured into 500 ml. of water and the organic phase was separated. The aqueous phase was extracted three times with 50 ml. portions of benzene, and these three portions were added to the organic phase. This combined organic phase was then washed with three 25 ml. portions of an aqueous 10% sodium bisulfite solution, next with 125 ml. of water, and finally dried over anhydrous sodium sulfate. Evaporation of the dried organic phase gave an 80% yield of $\Delta^5$-pregnene-3$\beta$,19,21-triol-20-one 3,19,21-triacetic as a crystalline solid.

*Example II*

To a solution of 1 gram of $\Delta^5$-pregnene-3$\beta$,19,21-triol-20-one 3,19,21-triacetate in 30 cc. of methanol, refluxing under a nitrogen atmosphere in a suitable reaction vessel equipped with a reflux condenser, there was added over a 30 minute period a solution of 0.17 gram of potassium hydroxide in 0.2 cc. of water and 2.5 cc. of methanol. Following this addition, refluxing was continued for 2 hours. Next, the solution was cooled, neutralized with acetic acid and concentrated under reduced pressure. The addition of water to the concentrated solution followed by crystallization of the thus-precipitated solid from acetone-hexane gave $\Delta^5$-pregnene-3$\beta$,19,21-triol-20-one in substantially quantitative yield.

*Example III*

A mixture of 1 gram of $\Delta^5$-pregnene-3$\beta$,19,21-triol-20-one, 0.32 gram of acetic anhydride and 4 cc. of pyridine, contained in a suitable reaction vessel equipped with cooling means, was cooled to −20° C., and maintained at that temperature for 16 hours. Following this reaction period the reaction mixture was poured into ice water and the precipitate formed thereby was filtered, washed with water and dried. Crystallization from acetone-hexane gave $\Delta^5$-pregnene-3$\beta$,19,21-triol-20-one 21-acetate in substantially quantitative yield.

*Example IV*

To a mixture of 0.1 gram of $\Delta^5$-pregnene-3$\beta$,19,21-triol-20-one 3,19,21-triacetate and 50 cc. of ethanol, contained in a suitable reaction vessel equipped with a stirrer, there was added a mixture of 2.5 grams of brewers' malt in 250 cc. of water. The resulting reaction mixture was maintained at room temperature, with constant stirring, for 48 hours. Following this reaction period the reaction mixture was extracted with ethyl acetate and the extract was washed with water, then dried over anhydrous sodium sulfate, and finally evaporated. Crystallization from acetone-hexane gave $\Delta^5$-pregnene-3$\beta$,19,21-triol-20-one 3,19-diacetate.

*Example V*

To a solution of 0.1 gram of $\Delta^5$-pregnene-3$\beta$,19,21-triol-20-one 3,19-diacetate in 0.4 cc. of pyridine, contained in a suitable reaction vessel, there was added 0.2 cc. of benzoyl chloride. The resulting reaction mixture was heated on a steam bath for 1 hour, following which it was poured into ice water. The precipitate formed thereby was filtered, washed with water and dried. Crystallization from methylene chloride-hexane gave $\Delta^5$-pregnene-3$\beta$,19,21-triol-20-one 3,19-diacetate-21-benzoate in substantially quantitative yield.

*Example VI*

To a solution of 0.1 gram of $\Delta^5$-pregnene-3$\beta$,19,21-triol-20-one 3,19-diacetate-21-benzoate in 50 cc. of ethanol, contained in a suitable reaction vessel equipped with a reflux condenser, there was added 10 cc. of an aqueous 2.5% solution of hydrochloric acid. The resulting reaction mixture was refluxed for two and one half hours, then poured into water, extracted with ethyl acetate and the extract washed with water to neutrality, dried over anhydrous sodium sulfate and evaporated to dryness. Crystallization of the dried residue from acetone-hexane gave $\Delta^5$-pregnene-3$\beta$,19,21-triol-20-one 21-benzoate in substantially quantitative yield.

*Example VII*

A mixture of 1 gram of $\Delta^5$-pregnene-3$\beta$,19,21-triol-20-one 21-acetate, 80 cc. of toluene and 20 cc. of cyclohexanone contained in a suitable reaction vessel equipped with a reflux condenser and distillation apparatus, was dried by distilling off 10 cc. of the solvent mixture. A solution of 1 gram of aluminum isopropoxide dissolved in 7 cc. of anhydrous toluene was then added, and the resulting reaction mixture was refluxed for 45 minutes. Following this reaction period, 4 cc. of acetic acid were added to the reaction mixture, and the solvent mixture was then removed by steam distillation. Next, the product was extracted several times with ethyl acetate, and these organic extracts were washed with an aqueous 5% hydrochloric acid solution, then with water, then with an aqueous 10% sodium carbonate solution and finally with water until neutral. The neutral extract was then dried over anhydrous sodium sulfate and evaporated to dryness. Crystallization from acetone-hexane afforded $\Delta^4$-pregnene-19,21-diol-3,20-dione 21-acetate.

*Example VIII*

The procedure of Example VII was repeated in every detail but one, namely, $\Delta^5$-pregnene-3$\beta$,19,21-triol-20-one 21-acetate was replaced by the corresponding 21-benzoate, resulting in the formation of $\Delta^4$-pregnene-19,21-diol-3,20-dione 21-benzoate.

*Example IX*

A solution of 1 gram of $\Delta^4$-pregnene-19,21-diol-3,20-dione 21-acetate in 10 cc. of acetone, contained in a suitable reaction vessel equipped with thermometer, stirrer and cooling means, was cooled to 0° C. Next, a nitrogen atmosphere was introduced into the reaction vessel, following which an aqueous 8 N chromic acid solution (prepared by mixing 26 grams of chromium trioxide with 23 cc. of concentrated sulfuric acid and then diluting with water to give 100 cc. of acid solution) was added dropwise, with stirring, to the reaction mixture until the color of the reagent persisted in the reaction mixture. At this point, the reaction mixture was stirred for an additional 5 minutes at 0–5° C. and then diluted with water to cause precipitation. The resulting precipitate was collected, washed with water and then dried under vacuum, thus affording a crude product which, upon recrystallization from acetone-hexane, gave 10-carboxy-$\Delta^4$-pregnen-21-ol-3,20-dione 21-acetate.

*Example X*

The procedure of Example IX was repeated in every detail but one, namely, $\Delta^4$-pregnene-19,21-diol-3,20-dione 21-acetate was replaced by the corresponding 21-benzoate, thus affording 10-carboxy-$\Delta^4$-pregnen-21-ol-3,20-dione 21-benzoate.

*Example XI*

To a solution of 1 gram of 10-carboxy-$\Delta^4$-pregnen-21-ol-3,20-dione 21-acetate in 50 cc. of ethanol, contained in a suitable reaction vessel equipped with a reflux condenser, there were added 10 cc. of aqueous 2% hydrochloric acid. The resulting reaction mixture was refluxed for 1 hour, following which it was concentrated to half its volume under vacuum and then poured into ice water, with stirring, and extracted with ethyl acetate. The extract was washed with water until neutral, then dried over anhydrous sodium sulfate and evaporated to dryness, giving a crude mixture of 19-nor-desoxycorticosterone and its 21-acetate. Reacetylation of this mixture, followed by crystallization from acetone-hexane, gave pure 19-nor-desoxycarticosterone 21-acetate.

*Example XII*

The procedure of Example XI was repeated in every detail except for the following. The 21-acetate of 10-carboxy-$\Delta^4$-pregnen-21-ol-3,20-dione was replaced by the corresponding 21-benzoate, and no reacetylation of the crude product was necessary. This procedure gave 19-nor-desoxycorticosterone 21-benzoate.

*Example XIII*

To a solution of 1 gram of $\Delta^4$-pregnene-19,21-diol-3,20-dione 21-acetate in 60 cc. of methanol, contained in a suitable reaction vessel equipped with a reflux condenser, there was added one gram of potassium carbonate dissolved in 6 cc. of water. The resulting reaction mixture was refluxed for 1 hour, following which it was poured into ice water. The precipitate thus formed was filtered, washed with water and dried over anhydrous sodium sulfate. Recrystallization from acetone-hexane gave $\Delta^4$-pregnene-19,21-diol-3,20-dione.

*Example XIV*

The procedure of Example XIII was repeated in every detail except one, namely, the steroid starting material was replaced by 10-carboxy-$\Delta^4$-pregnen-21-ol-3,20-dione 21-acetate, thus, producing the corresponding 21-free hydroxy compound, 10-carboxy-$\Delta^4$-pregnen-21-ol-3,20-dione.

It will be obvious to those skilled in the art that other changes and variations can be made in carrying out the present invention without departing from the spirit and scope thereof as defined in the appended claims.

I claim:
1. A method of preparing a 19-nor-desoxycorticosterone 21-acylate which comprises:
   (1) reacting a 3,19-diacylate of $\Delta^5$-pregnene-3β, 19-dol-20-one with a lead tetraacylate in the presence of a catalytic amount of boron trifluoride etherate to give a 3,19,21-triacylate of $\Delta^5$-pregnene-3β,19,21-triol-20-one,
   (2) selectively deacylating said triacylate at the 3- and 19-position thereof to produce the corresponding 21-acyloxy-$\Delta^5$-pregnene-3β,19-diol-20-one,
   (3) subjecting the thus-produced 21-acylate to Oppenauer oxidation to give the corresponding 21-acyloxy-$\Delta^4$-pregnen-19-ol-3,20-dione,
   (4) reacting said 21-acyloxy-$\Delta^4$-pregnen-19-ol-3,20-dione under an inert atmosphere at a temperature of from about −20° C. to about 5° C., with chromic acid to produce the corresponding 21-acyloxy-10-carboxy-$\Delta^4$-pregnene-3,20-dione, and
   (5) heating said 10-carboxy steriod to decarboxylate it, thereby producing the corresponding 19-nor-desoxycorticosterone 21-acylate.

2. A process according to claim 1 wherein said 19-nor-desoxycorticosterone 21-acylate is hydrolyzed to produce 19-nor-desoxycorticosterone.

3. A process according to claim 1 wherein said 3,19-diacylate of $\Delta^5$-pregnene-3β,19-diol-20-one is the 3,19-diacetate, said lead tetraacylate is the tetraacetate, and said 19-nor-desoxycorticosterone-21-acylate is the 21-acetate.

4. A process according to claim 1 wherein said selective deacylation is carried out so as to produce 21-acetoxy-$\Delta^5$-pregnene-3β,19-diol-20-one.

5. A process according to claim 1 wherein said selective deacylation is carried out so as to produce 21-benzoyloxy-$\Delta^5$-pregnene-3β,19-diol-20-one.

6. A process according to claim 1 wherein said selective deacylation is carried out by deacylating said 3,-19,21-triacylate of $\Delta^5$pregnene-3β,19,21-triol-20-one to give the corresponding 3β,19,21-triol, and esterifying the 21-hydroxy group of said triol by reacting it in pyridine at a temperature of from about −30° C. to about 0° C. with a slight excess of acetic anhydride.

7. A progress according to claim 1 wherein said selective deacylation is carried out by contacting the 3,19,21-triacetate of $\Delta^5$-pregnene-3β,19,21-triol-20-one with malt enzyme to give the corresponding $\Delta^5$-pregnene-3β,19,21-triol-20-one 3,19-diacetate, benzoylating said diacetate to produce $\Delta^5$-pregnene-3β,19,21-triol-20-one 3,19-diacetate-21-benzoate, and subjecting said 3,19-diacetate-21-benzoate to acid hydrolysis to give 21-benzoyloxy-$\Delta^5$-pregnene-3β,19-diol-20-one.

8. $\Delta^5$-pregnene-3β,19,21-triol-20-one.
9. $\Delta^5$-pregnene-3β,19,21-triol-20-one 3,19,21-triacetate.
10. $\Delta^5$-pregnene-3β, 19,21-triol-20-one 3,19-diacetate-21-benzoate.
11. $\Delta^5$-pregnene-3β,19,21-triol-20-one 21-acylate.
12. $\Delta^5$-pregnene-3β,19,21-triol-20-one 21-acetate.
13. $\Delta^5$-pregnene-3β,19,21-triol-20-one 21-benzoate.

References Cited by the Examiner
UNITED STATES PATENTS

| | | | |
|---|---|---|---|
| 2,966,444 | 12/60 | Hasegawa et al. | 195–51 |
| 3,013,025 | 12/61 | Zaffaroni | 260—397.1 |

LEWIS GOTTS, *Primary Examiner.*